E. M. HOWELL.
PROCESS OF EXTRACTING ESSENCES AND TINCTURES FROM VANILLA BEANS.
APPLICATION FILED JULY 11, 1906.
921,251.
Patented May 11, 1909.
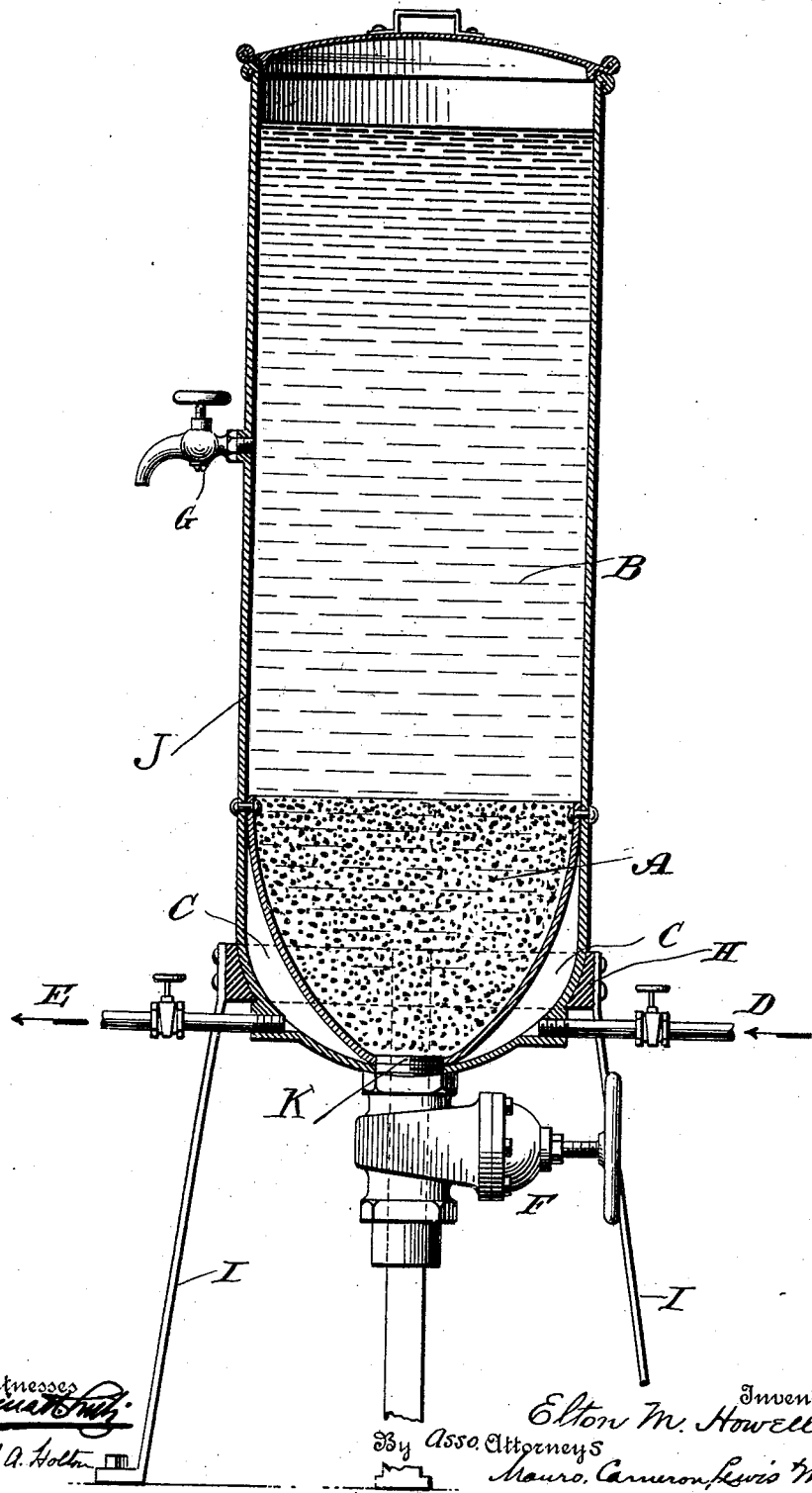

UNITED STATES PATENT OFFICE.

ELTON M. HOWELL, OF NEW YORK, N. Y.

PROCESS OF EXTRACTING ESSENCES AND TINCTURES FROM VANILLA-BEANS.

No. 921,251.  Specification of Letters Patent.  Patented May 11, 1909.

Application filed July 11, 1906. Serial No. 825,733.

*To all whom it may concern:*

Be it known that I, ELTON M. HOWELL, a citizen of the United States, residing at No. 2528 Broadway, in the borough of Manhattan, city, county, and State of New York, have invented a certain new and useful process of extracting essences and tinctures from vanilla-beans in order to obtain the largest possible strength and yield of such essences from a given quantity of such raw materials.

At present the usual agent employed in extracting such tinctures and essences is alcohol. This alcohol, as used at the present time, is ordinarily either used pure or mixed with water. At the present time such alcohol or diluted alcohol is used at the ordinary atmospheric temperature. Were the alcohol used in a heated form a larger percentage of the essences and tinctures would be extracted from the raw material, but heretofore it has been found impracticable to use alcohol of a high temperature, except in a still, because of its volatile character when highly heated, in other words, when highly heated it vaporizes and entails a waste of the spirit, and poor results follow. And when distilled the resultant essence or tincture is of a cloudy and unsatisfactory quality from a commercial standpoint.

The mode of practicing my invention is as follows, reference being had to the accompanying drawing by way of illustration of apparatus suitable for carrying out my process. I ordinarily use a cylindrical covered kettle J of a height approximately of seventy inches, and of a diameter of twenty inches. Around the lower end of this kettle, for a distance of about one-sixth of its height, is an ordinary steam jacket C. The bottom proper of the kettle, above the steam jacket, has an aperture in its center leading a pipe K down through the center of the steam jacket and at the lower end of this pipe is a valve F. Steam is introduced into this steam jacket through a valved pipe D and is permitted to escape through a valved pipe E. A test cock G is also provided at the side of the vessel for withdrawing portions of the solvent for determining its temperature and degree of saturation. Any ordinary kettle with similar steam heating and valve apparatus may be used, but I have found a kettle of the above proportions to give the best results. In the kettle proper I place the raw materials from which I wish to extract the essence or tincture, in a ground up form, together with a mixture of alcohol and water consisting of approximately 40% alcohol and 60% water. Steam is then turned on in the steam jacket. The alcohol above the mass of materials gradually infiltrates slowly through the mass of raw material and the said mass of material, with the alcoholic mixture, which is slowly mixing with and over it, becomes gradually heated. Care is taken to prevent the alcohol reaching the vaporization stage and the mass and the superimposed alcoholic mixture heats slowly toward the top. When the top approaches a temperature of approximately 100 degrees, I turn off the heat and permit the whole mass to cool to the atmospheric temperature. By this time a large portion of the alcohol mixture has become mixed with the ground up raw material in the bottom of the kettle, and I draw it off by opening the valve at the base and permitting it to percolate into a vessel. I then pour the liquid so drawn into the kettle, turn on the steam as before and repeat the operation exactly as before, turning off the steam as soon as the upper part of the alcoholic mixture has again attained a temperature of approximately 100 degrees. This operation is repeated from six to ten times until practically all of the essence is extracted.

The quantities for the alcoholic mixture may vary. Pure alcohol may be used with good results, but it is more economical to use the mixture with the minimum quantity of alcohol, and I find my process will give good results with a dilution containing 40% of alcohol.

The temperature mentioned (100 degrees Fahrenheit) may vary, so long as vaporization does not set in, but I have found the best results where approximately that temperature at the top is the limit.

What I claim for my invention over present processes is that by its use a larger percentage of soluble constituents of the vanilla beans can be extracted than by present methods; a quality of raw material, which cannot be worked at a profit under present methods, can be used and a first class product obtained because a much larger percentage of the essences is extracted by my method, and also by my invention the extraction of the essences and tinctures from any given quantity of raw material can be all done in a much shorter time, at a great saving of labor; furthermore, there is a large saving in alcohol alone over all other methods. Furthermore, the use of a column of alcoholic dilution of the approximate height as indicated, prolongs the time taken to raise the temperature at the top to a point where it vaporizes, thus prolonging the time during which the raw material is subjected to the extracting power of the heated alcohol or dilution.

I claim:

The method of extracting the soluble constituents of vanilla beans, in which method a mass of raw ground vanilla beans in a suitable closed vessel is subjected to the solvent action of dilute alcohol, consisting in maintaining a column of said solvent in contact with and above said beans, the diameter of said column bearing to its length the approximate ratio of two to seven, heating the lower portion of said column till the temperature of the top of the column of solvent approximates 100° F., then cooling the column of solvent and beans to that of the surrounding atmosphere, percolating the liquid portion through the ground mass and returning the percolate to the said mass to complete the extraction substantially as described.

ELTON M. HOWELL.

In presence of—
 JOHN J. O'CONNELL,
 GERTRUDE K. BRENNAN.